No. 873,206. PATENTED DEC. 10, 1907.
H. BERNS.
POCKET KNIFE.
APPLICATION FILED OCT. 22, 1906.
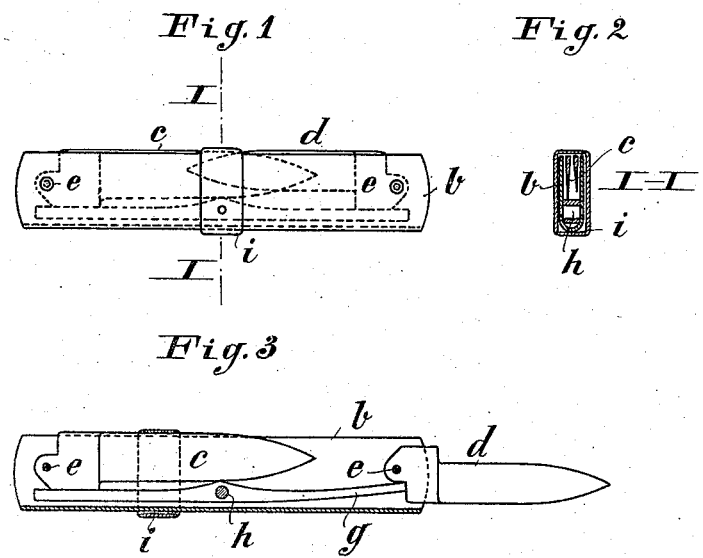

UNITED STATES PATENT OFFICE.

HUGO BERNS, OF OHLIGS, GERMANY.

POCKET-KNIFE.

No. 873,206.　　　　Specification of Letters Patent.　　　Patented Dec. 10, 1907.

Application filed October 22, 1906. Serial No. 340,082.

*To all whom it may concern:*

Be it known that I, HUGO BERNS, residing in the city of Ohligs, Empire of Germany, Rhenish Prussia, a subject of the Emperor of Germany, have invented a new and useful Improvement in Pocket-Knives, of which the following is a specification.

My invention refers to pocket knives and has for its object a knife in which the blades are thrown out by a spring being secured in their closed position within a U-shaped handle.

My invention is more fully described in the following specification and illustrated on the accompanying drawing on which Figure 1 is an external view of the complete knife both blades closed, Fig. 2 is a vertical section through the knife one blade open, Fig. 3 is a section taken along I—I of Fig. 1.

Like letters of reference indicate like parts in the drawings.

$a$ represents the handle of the pocket knife which consists preferably of a piece of sheet metal formed in any desired shape and bent as shown in U-form Fig. 2 to provide two upright flanges $b$, $c$ between which the blades are located. The blades are linked to the handle $a$ by pivot pins $e$.

$g$ is a flat spring which is secured within the handle by a pin $h$. Each end of this spring acts as a spring on its corresponding blade as seen from Fig. 3 and the force of the spring is powerful enough to throw the blade out of the handle or to open it automatically.

$i$ is a slide fitting over the handle and holding the blades closed as shown. When shifted to one end of the handle one blade is free and caused to spring open by the action of the spring and the same is the case with the other blade.

What I desire to secure by Letters Patent is:

In a pocket knife the combination of a U shaped handle, two blades pivotally connected thereto, a blade spring fixed at the bottom of the handle and acting on the blades and a slide surrounding the handle and holding the blades in the closed position as described and for the purpose set forth.

HUGO BERNS.

Witnesses:
　OTTO KÖNIG,
　AD. SCHUBERT.